United States Patent [19]

Moss

[11] 4,276,469
[45] Jun. 30, 1981

[54] DATA CARD READER

[76] Inventor: Mark W. Moss, P.O. Box 17024, Irvine, Calif. 92713

[21] Appl. No.: 67,285

[22] Filed: Aug. 17, 1979

[51] Int. Cl.³ .................. G06K 7/10; G06K 21/00; G06K 19/06
[52] U.S. Cl. ................................. 235/458; 235/489; 235/494; 235/436
[58] Field of Search ............... 235/436, 458, 454, 494; 250/568, 555

[56] References Cited

U.S. PATENT DOCUMENTS

| | | | |
|---|---|---|---|
| 3,408,483 | 10/1968 | Zuse | 235/436 |
| 3,496,341 | 2/1970 | Mizuta et al. | 235/436 |
| 3,598,964 | 8/1971 | Dell et al. | 235/436 |
| 3,602,697 | 8/1971 | Tanaka et al. | 235/436 |
| 3,673,389 | 6/1972 | Kapsambelis et al. | 235/436 |

Primary Examiner—Daryl W. Cook
Attorney, Agent, or Firm—Lyle J. Schlyer

[57] ABSTRACT

A card reader capable of accurately reading a data card inserted in any of four possible orientations includes a card with two data tracks, a card reader producing two corresponding data pulse trains, and two differentiation networks for producing two differentiated data pulse trains. The differentiated data pulse trains are combined to form a clock pulse train and, further, are latched to produce two latched data trains. A first selector circuit assigns a first binary code value to the latched data train exhibiting the first appearing pulse and a second selector circuit sets a storage direction flag dependent upon the position of a subsequent data pulse. The latched data train assigned a first binary code value, the clock pulse train, and the storage direction flag are received by a serial to parallel converter which stores least significant digit first or most significant digit first dependent upon the flag.

8 Claims, 8 Drawing Figures

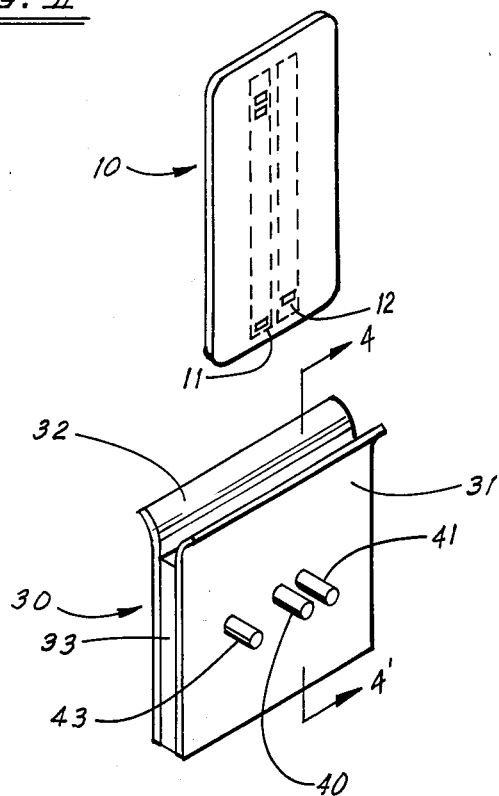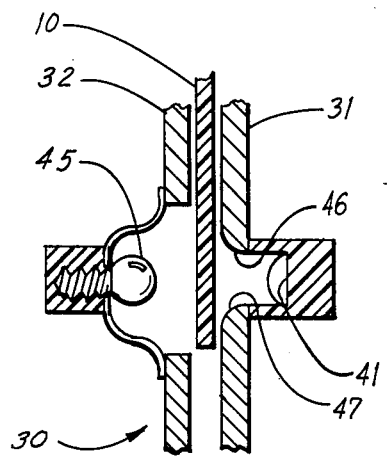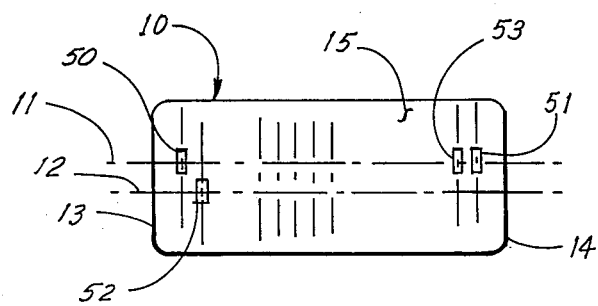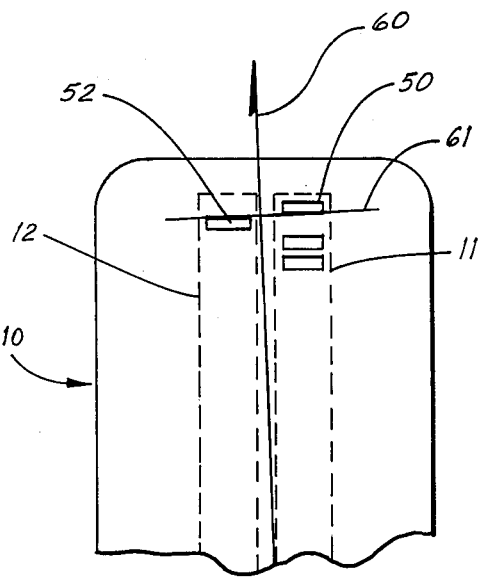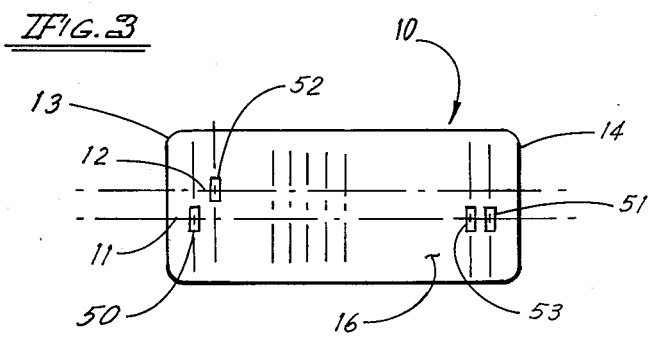

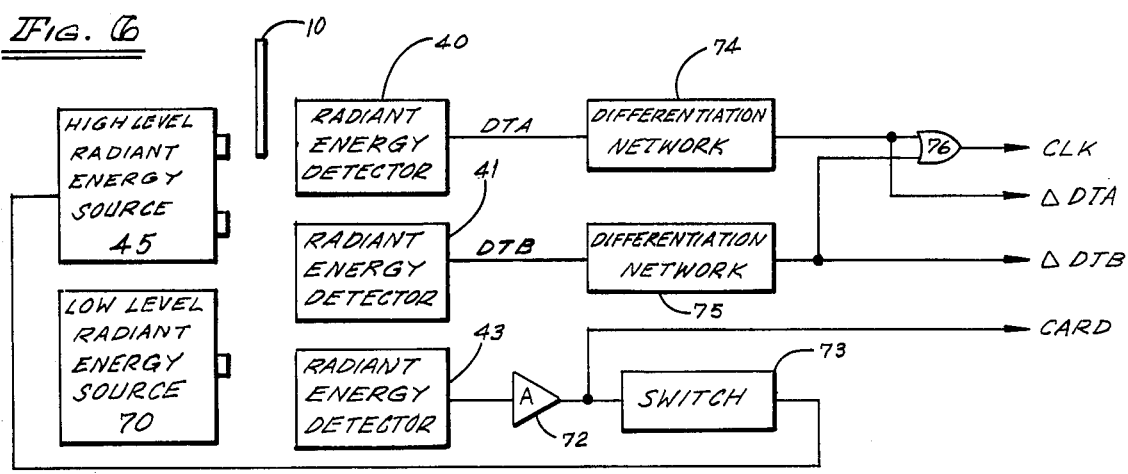
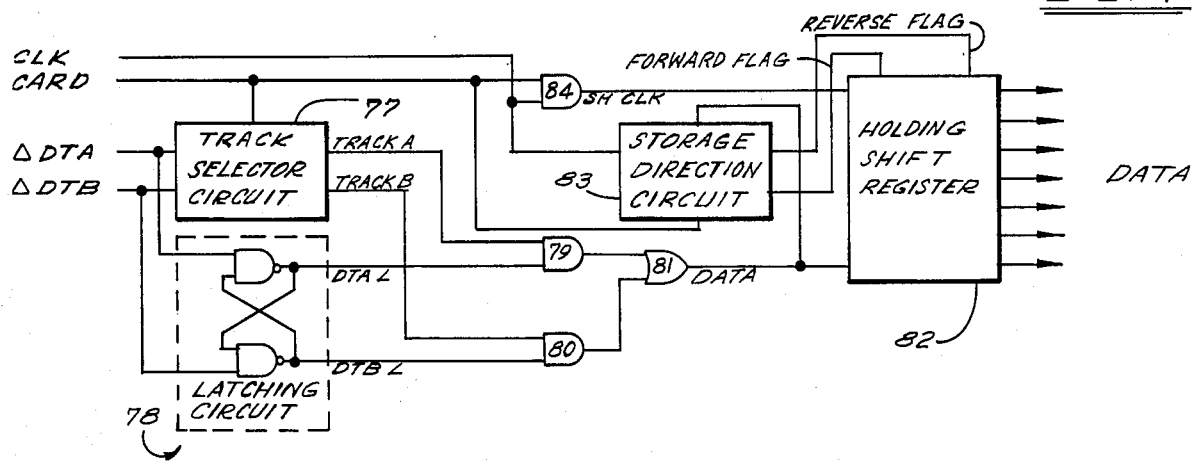
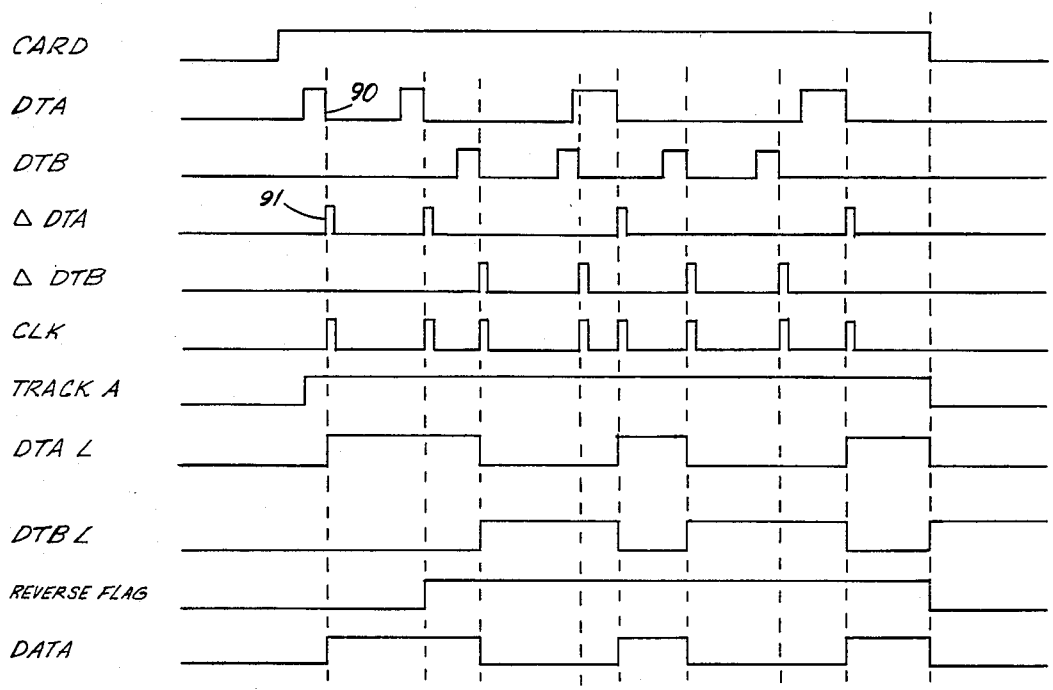

DATA CARD READER

BACKGROUND OF THE INVENTION

1. Field of the Invention

This invention relates generally to the field of radiant energy responsive data card readers and specifically to data encoded cards in combination with readers.

2. Description of the Prior Art

Data card readers, capable of accepting and interpreting data encoded cards, are commonly used to input information to control systems. Applications for electronic control systems based upon data card input grow steadily as the convenience and cost of microprocessors and other computers becomes increasingly attractive. In control systems based upon data card input, often the most time consuming step of entering information involves proper orientation of the data card. An ideal data card reader would accept a data card in any orientation, would read the data rapidly and accurately, and would embody design simplicity consistent with an economical price tag.

Attempts to provide a card reader capable of extracting data from data cards positioned in other than a single orientation can be found in U.S. Pat. No. 3,673,389 to Kapsambelis et al., and in this applicant's previous application bearing Ser. No. 928,803 filed July 28, 1978, now U.S. Pat. No. 4,184,632.

The Kapsambelis patent provides the capability of reading a data card in any of four possible positions. However, a trinary coding system is used which requires extensive circuitry to interpret the card orientation data and further circuitry is needed in the computer or other electronic host to assimilate the data from the card in the proper order of significance. In addition, Kapsambelis utilizes a motor driven card reading mechanism, thus decreasing operating reliability.

This applicant's prior application provides a simplified device which reads a card in two of the four possible orientations but utilizes a physical stop to prevent insertion of the data card in the remaining two orientations. In addition, the accuracy of the card reader of the prior application is, to some degree, dependent upon the speed with which the data card is extracted from the reader, the alignment of the data card during reading, and improper overlapping of data perforations of opposed data tracks.

SUMMARY OF THE INVENTION

In order to provide a low cost and reliable data card reader capable of reading a rectangular card in any of four possible orientations which data card reader is also insensitive to minor misalignment and data perforation overlap, and is not subject to extraneous data signals produced by insertion or withdrawal of the card, the applicant proposes a data card incorporating two data tracks surrounding a plurality of data encoded perforations.

A first radiant energy source and cooperating radiant energy detectors produce two data pulse trains corresponding to the data encoded perforations. Each data pulse train is received by a differentiation network which produces a short, differentiated pulse coincidental with the trailing edge of each data pulse. The differentiated pulse trains are ORed to produce a clock pulse train and are also latched to produce two latched data pulse trains.

Two selector circuits determine the card orientation by interpreting the first two data pulses read. The first selector circuit assigns a first binary code value to the latched data pulse train exhibiting the first occuring data pulse. The second selector circuit establishes a forward or reverse storage direction flag depending upon whether the next occuring data pulse resides in the first binary code data track or in the other (second binary code value) data track.

The clock pulse train, the latched first binary code pulse train, and the storage direction flag are received by a serial to parallel converter which stores the remainder of data, the storage positions being filled least significant digit first or most significant digit first depending upon the storage direction flag. Storage of each data value is triggered by the trailing edge of each clock pulse. Coincidence of a value in the latched data train results in storage of a first binary code value and absence of a value in the latched data train results in storage of a second binary code value.

Accuracy and reliability are enchanced by physical proximity of the data tracks on the data card, by flaring the bores in which the radiant energy detectors reside, and by providing a CARD signal from a third energy source which CARD signal gates the storage of data and, in addition, controls the power to the high level radiant energy source.

BRIEF DESCRIPTION OF THE DRAWINGS

The invention will be more fully appreciated from the following detailed description of the preferred embodiment thereof taken in conjunction with the appended drawings wherein:

FIG. 1 is a perspective view of a data card and card reader as proposed;

FIG. 2 is a plan view of the data card showing, by means of centerlines, the potential data sites;

FIG. 3 is a view from the back side of the data card of FIG. 2;

FIG. 4 is a cross section view of the card reader taken along cut line 4—4 of FIG. 1;

FIG. 5 is a view of the data card and a direction-of-travel arrow illustrating the effects of vertical misalignment;

FIG. 6 is a block diagram showing schematically the operation of the data card reader and clock generating portions of the circuit;

FIG. 7 is a block diagram showing schematically the operation of the interface portion of the circuit; and, FIG. 8 is a timing diagram showing the interrelationship of the pulses produced.

DETAILED DESCRIPTION OF THE DRAWINGS

Now referring to FIG. 1, the physical orientation of the data card 10, the data card reader 30, and the alignment of the card 10 with respect to the radiant energy detectors 40, 41 and 43 may be seen. The data card 10 incorporates two parallel data tracks 11 and 12, represented in the drawing by dashed lines. Preferably the two data tracks are equally spaced from and on opposed sides of a vertical centerline, unshown, of the rectangular card 10.

The card reader 30 preferably incorporates three radiant energy detectors 40, 41 and 43, each having a corresponding and cooperating radiant energy source as will be more readily apparent with respect to the discussion of FIG. 4. A First radiant energy detector 40 and a second radiant energy detector 41 reside in one of two parallel, spaced apart planar surfaces 31 and 32. A guide bar 33 may be seen adjacent to one edge and interposed between the planar surfaces 31 and 32. A second guide bar, unshown, is located adjacent to and interposed between the opposite edge of the planar surfaces 31 and 32. As shown in FIG. 1, the first and second radiant energy detectors 40 and 41 are positioned to correspond to the position of the data tracks 11 and 12 of the data card 10 when the card 10 is allowed to move through the slot created by the planar surfaces 31 and 32 and the guide bars 33.

A third radiant energy detector 43 may be seen to reside in a planar surface 31 of the card reader 30 spaced apart from said first and second radiant detectors 40 and 41. The third radiant energy detector 43 is adapted to detect the presence of the data card 10 within the card reader 30. In the preferred embodiment, and as will be further disclosed by the schematic of FIG. 6, the third radiant energy detector 43 cooperates with a radiant energy source which requires low power levels for operation. This low level radiant energy source is continuously energized during operation and standby of the card reader 30. During operation, the data card 10 is dropped through the card reader 30. The leading edge of the card 10 causes a signal from the third radiant energy detector 43 to energize a high level radiant energy source or sources which cooperate with the first and second radiant energy detectors 40 and 41. A high level radiant energy source is utilized to provide improved resolution and thus increased accuracy for data assimilation while a low level radiant energy source provides switching without excessive power drain. Further functions of the signal produced by the third radiant energy detector 43 will be more readily apparent from the discussion of FIGS. 6, 7 and 8.

Now referring to FIGS. 2 and 3, the data card 10 may be shown in its four possible orientation attitudes. Being rectangular, only the two narrow ends 13 and 14 of the data card 10 may be inserted into the card reader 30. For discussion purposes, the planar surface 15 of the card 10 shown in FIG. 2 shall be designated the front side and the planar surface 16 shown in FIG. 3 shall be designated the reverse side. The horizontal centerlines of the two data tracks 11 and 12 and the vertical centerlines designate a portion of the data perforation locations. The preferred embodiment incorporates a binary encoding system which requires that one of the two data tracks 11 or 12 be chosen to contain the first binary code values (i.e., function as a "ones track"). The ones track must include the first appearing data perforation, a condition which must be consistent as viewed from either end 13 or 14. In the drawing, the first occuring perforations 50 and 51 thus designate the ones track 11.

The second requirement of the encoding system of the preferred embodiment concerns the storage direction. Assume for this discussion that the left hand edge 13 of the card 10 is to be the leading edge when the card 10 is inserted into the card reader 30 in a "forward direction". This is encoded on the card 10 by providing a second occuring perforation 52 to reside in the data track 12 assigned the second binary code value (i.e., the "zeros track"). If the second occuring perforation 53 resides in the ones track 11, as would be the case if the opposite edge 14 of the card 10 were inserted first, the encoded data is considered as being read in a "reverse" direction. As will be more readily apparent from a discussion of FIGS. 6, 7 and 8, the forward and reverse directions determine whether subsequently occuring data shall be considered to be appearing least significant digit first or most significant digit first.

FIG. 4 shows the greater details of the second radiant energy detector 41 and the corresponding and cooperating radiant energy source 45. It may be shown that the radiant energy detector 41 resides within a bore 46 of the appropriate planar surface 31 of the card reader 30. Preferably, as illustrated in the drawings, the outer edge of the bore incorporates a flared portion 47. Experience has taught that were the cylindrical inner surface of the bore 46 to terminate at the inner surface of the planar surface 31 in a perpendicular or sharp edged fashion, there would be a tendency for contaminants, such as grease and grime, carried by the surface of the card 10, to be deposited in the bore 46 by a wiping action. By incorporating a flared section 47 through swaging, counterboring or other appropriate production methods, the accumulation of contaminants, along with the coincidental blinding of the radiant energy detector 41, may be avoided.

Now referring to FIG. 5, a further improvement and refinement of the preferred embodiment may be seen. In an effort to pack data perforations 50, 52, etc. onto a data card 10, the spacing between sequential perforations must be minimal. This may lead to overlapping of the trailing edge of a first pulse 50 and the leading edge of a second pulse 52 as a result of minor misalignment of the card 10 with respect to the direction of travel, as represented by a direction-of-travel arrow 60 and perpendicular crossbar 61. To some extent, overlapping of data perforations due to misalignment may be minimized by placing the data tracks 11 and 12 in close proximity as shown. However, the obvious problems which overlapping data signals may cause can be further avoided by utilizing only the trailing edge of each perforation 50, 52, etc. This is provided in the preferred embodiment by immediate differentiation of the data pulses produced by the data perforations as shown in the schematic of FIG. 6.

Considering the schematic representation of FIG. 6 in conjunction with the timing diagram of FIG. 8, the data card 10 may be shown to interrupt a beam of radiant energy between a low level radiant energy source 70 and a radiant energy detector 43. The output of the radiant energy detector 43 is boosted to an appropriate operating level by an amplifier 72 and becomes the CARD signal, acting as an envelope which gates and resets various portions of the circuit.

The CARD signal further operates a switch 73 which energizes a high level radiant energy source 45, cooperating with first and second radiant energy detectors 40 and 41 to produce two data pulse trains, DTA and DTB, respectively, from the two data tracks 11 and 12 of the data card 10. Differentiation networks 74 and 75 are provided to produce differentiated data pulse trains ΔDTA and ΔDTB from the data pulse trains DTA and DTB. As clearly shown in FIG. 8, the trailing edge of each data pulse 90 initiates and coincides with the leading edge of each differentiated data pulse 91. This allows accurate assimilation of data from the data card 10 even in light of misalignment problems as illustrated in FIG. 5 and discussed previously. By differentiating data pulses as a first processing step, sequential perforations of alternate data tracks 11 and 12 may be intentionally overlapped, thus providing a measure of security against use of nonconforming card readers in extracting confidential information.

As shown in FIG. 6 and FIG. 8, the differentiated data pulse trains ΔDTA and ΔDTB may be combined in an OR circuit 76 to produce a clock pulse train CLK.

Now referring to FIG. 7, the differentiated data pulse trains ΔDTA and ΔDTB may be shown to input a track selector circuit 77 which assigns a first binary value to the pulse train exhibiting the first occuring pulse 90. This function is accomplished by creating a track selector signal TRACK A or TRACK B which combine through an AND circuit 79 or 80 with the respective data pulse train. An OR circuit 81 combines the output of the AND circuits 79 and 80 such that the data pulse train exhibiting the first occuring data pulse determines the content of a DATA signal as shown. Prior to combining with the track selector signals TRACK A and TRACK B, the differentiated data pulse trains ΔDTA and ΔDTB are latched, utilizing a known latching network as illustrated, producing corresponding latched data trains DTA L and DTB L as shown more clearly in FIG. 8. The latched signals DTA L and DTB L are provided to minimize timing errors by assuring the presence of an appropriate data signal to coincide with the trailing edge of each clock pulse which functions to trigger the storage of data in a holding shift register 82.

The clock pulse train CLK combines with the card signal CARD in an AND circuit to produce a shift clock signal SHCLK which is fed to the holding shift register 82 as a clock. Thus the card signal CARD gates the storage of data, rather than creating an extraneous signal which might possibly be interpreted as data, a problem encountered in previous designs.

The holding shift register 82 also recieves as input a storage direction indicator, FORWARD FLAG or REVERSE FLAG. The proper storage direction is determined in the storage direction circuit 83 by whether the second occuring data pulse resides in the "ones track" or the "zeros track". The timing diagram of FIG. 8 illustrates the propagation of an appropriate storage direction signal REVERSE FLAG. Clearly the holding shift register 82 which functions as a serial to parallel converter, may receive data either least significant digit first or most significant digit first. By providing the encoding constraint of the preferred embodiment, a storage direction indicator may be effectively provided.

To further illustrate the operation of this proposal, the assimilation of data from a data card 10 as shown in FIGS. 2 and 3 may be considered. Assuming the left hand edge 13 of FIG. 2 is encountered, the track 11 with the first occuring perforation 50 becomes track A. Since the second occuring perforation 52 resides in the other track 12, the reverse direction indicator REVERSE FLAG will be set. Assuming now that the right hand edge 14 of FIG. 2 were first encountered, again the same track 11 contains the first occuring pulse 51 and becomes track A while the second occuring pulse 53 now resides in the same track 11. Thus the forward direction indicator FORWARD FLAG will be set, providing for serial to parallel storage of data in the opposite direction.

Reversing the card 10 as in FIG. 3 gives a similar result. With the left hand edge 13 first, the first occuring pulse 50 and second occuring pulse 52 reside in the same tracks 11 and 12, respectively, thus resulting in an identical selection of track A and the storage direction indicator. Obviously, allowing the right hand edge 14 of FIG. 3 to lead will, again, produce the same result, since the storage direction will again be switched.

To complete the discussion of FIG. 7, the card signal CARD completes its function as envelope by providing a reset for the tract selector circuit 77 and the storage direction circuit 83.

It is understood that the embodiment described above is merely an example of the application of the principles of this invention. Additional embodiments may be devised by those skilled in the art without departing from the spirit or scope of the invention.

I claim:

1. An improved data card and data card reader combination comprising:
   a. a data card incorporating two data tracks, said data tracks surrounding a plurality of perforations spatially arranged to represent encoded data;
   b. at least one radiant energy source;
   c. at least two radiant energy detectors, including a first radiant energy detector and a second radiant energy detector;
   d. guide means for guiding the movement of said data card with respect to said first and said second radiant energy detectors whereby said detectors may produce a first and a second data pulse train corresponding to the perforations of said respective data tracks;
   e. first and second differentiation networks for receiving respectively said first and said second data pulse trains whereby said differentiation networks may produce a first and a second differentiated data pulse train;
   f. clock generating means for combining said first and said second differentiated data pulse trains whereby a clock pulse train may be produced; and
   g. a serial to parallel converter receiving said clock pulse train and at least one of said differentiated data pulse trains whereby the coincidence of said clock pulse train and said differentiated data pulse trains may be stored as binary code values.

2. The device of claim 1 further comprising:
   a. a latching network for receiving said differentiated data pulse trains whereby said latching network may produce a first latched data train exhibiting a continuous value beginning with the leading edge of each pulse of said first differentiated data pulse train and terminating with the leading edge of the next appearing pulse of said second differentiated data pulse train, said latching network further producing a second latched data train exhibiting values opposed to the values of said first latched data train;
   b. first selector means for assigning a first binary code value to one latched data train and a second binary code value to the other latched data train dependent upon selected encoded data values;
   c. a serial to parallel converter receiving said clock pulse train and said latched data train assigned a first binary code value, said serial to parallel converter causing to be stored a first binary code value upon the coincidence of the trailing edge of each clock pulse and the presence of a latched value, and said serial to parallel converter causing to be stored a second binary code value upon the coincidence of the trailing edge of each clock pulse and the absence of a latched value.

3. An improved data card and data card reader combination comprising a. a data card incorporating two data tracks surrounding a plurality of perforations spatially arranged to represent encoded data;
b. at least one radiant energy source;
c. at least two radiant energy detectors;
d. guide means for guiding the movement of said data card with respect to said radiant energy detectors whereby said detectors may produce two data pulse trains corresponding to the perforations of said data tracks;
e. first selector means for assigning a first binary code value to one data pulse train and a second binary code value to the other data pulse train dependent upon selected encoded data values;
f. second selector means for establishing a forward storage direction flag or a reverse storage direction flag dependent upon selected encoded data values;
g. clock generating means for producing a clock pulse train from said two data pulse trains; and
h. a serial to parallel converter receiving said storage direction flag, said clock pulse train and at least one of said data pulse trains whereby said encoded data may be stored sequentially with the most significant digit first where said storage direction flag incorporates a forward designation and said encoded data may be stored sequentially with the least significant digit first where said storage direction flag incorporates a reverse direction.

4. The device of claim 3 wherein:
a. said first selector means assigns a first binary code value to the data pulse train exhibiting the first appearing pulse and a second binary code value to the data pulse train not exhibiting the first appearing pulse; and
b. said second selector means establishes a forward storage direction flag when the second appearing pulse resides in the data pulse train assigned a first binary code value and a reverse storage direction flag when the second appearing pulse resides in the data pulse train assigned a second binary code value.

5. The device of claim 1 or claim 3 further comprising:
a. a third radiant energy detector cooperating with said guide means whereby a continuous card signal may be produced by the presence of the card in the card reader; and
b. an AND circuit receiving said card signal and the data pulse train to be fed to the serial to parallel converter whereby the card signal may be used to gate the data to be stored.

6. The device of claim 5 further comprising:
a. a first continuously illuminated radiant energy source incorporating low power level requirements and cooperating with said third radiant energy detector to provide the card signal;
b. a second radiant energy source incorporating higher energy level requirements than said first radiant energy source, said second radiant energy source cooperating with said first and second radiant energy detectors to produce said data pulse trains; and,
c. a switch controlled by said card signal and cooperating with said second radiant energy source whereby illumination of the higher level energy source is controlled by the presence of the card in the card reader.

7. The device of claim 1 or claim 3 wherein the two data tracks of the data card are parallel and in close proximity whereby errors induced by minor misalignment of the data tracks with respect to the radiant energy detectors may be minimized.

8. The device of claim 1 or claim 3 wherein the guide means includes a plate surrounding at least two bores wherein said radiant energy detectors reside, said bores incorporating a flared end interposed between the radiant energy detectors and the card, whereby fouling and obstruction of the bores by contaminants transported by the card may be avoided.

* * * * *